United States Patent [19]

Dussich

[11] 4,113,364
[45] Sep. 12, 1978

[54] SUNGLASS METHOD AND APPARATUS

[76] Inventor: Manlio V. Dussich, 383 N. Atlantic Ave., Cocoa Beach, Fla. 32931

[21] Appl. No.: 820,570

[22] Filed: Aug. 1, 1977

[51] Int. Cl.² .................. G02C 7/12; G02C 1/00; G03B 1/00
[52] U.S. Cl. ........................ 351/49; 351/84; 351/178
[58] Field of Search ............ 351/49, 84, 19, 178; 403/23, 345

[56] References Cited
U.S. PATENT DOCUMENTS

| | | | |
|---|---|---|---|
| 2,574,839 | 11/1951 | Pelzer | 351/86 |
| 3,884,561 | 5/1975 | Kodys | 351/83 |

FOREIGN PATENT DOCUMENTS 791,380 12/1935 France .......................... 351/49

Primary Examiner—Paul A. Sacher
Assistant Examiner—Rodney B. Bovernick
Attorney, Agent, or Firm—Duckworth, Hobby, Allen & Pettis

[57] ABSTRACT

A variable density polarizing attachment for spectacles having polarizing lenses therein is provided along with a method of making variable density polarizing spectacles. A pair of polarizing lenses are attached to standard spectacles or eyeglasses already having polarizing lenses therein utilizing posts attached to the lenses. The posts are grooved to rotatably hold a polarizing lens adjacent an existing polarizing lens on a pair of spectacles so that existing spectacles can be converted to variable density polarizing spectacles.

10 Claims, 7 Drawing Figures

SUNGLASS METHOD AND APPARATUS

BACKGROUND OF THE INVENTION

The present invention relates to polarizing lenses for attachment to existing spectacles already having polarizing lenses thereon so that by varying the position of the attached polarizing lenses, the transmission of light through the lens may be varied. In the past it has been common to provide spectacles having polarizing lenses in sunglasses to reduce the transmission of light through the lenses of the glasses to the eyes of the wearer. The polarizing lenses not only reduces the transmission of light, but reduces certain types of glare and reflections reaching the eyes of the wearer. It has also been suggested in the past to use spectacles having a pair of polarizing lenses for each eye mounted adjacent to each other, with one lens being rotable, generally by hand-fingers to vary the density through a pair of lenses, thereby varying the transmission of light therethrough. These prior art variable density spectacles have been manufactured and sold in small quantities, but have not gained wide popularity due to the wide variations in styles and tastes in spectacles and eyeglasses, and especially in sunglasses demanded. Typical prior art patents might be seen in the Schwartz U.S. Pat. No. 3,838,913 and the Archambault Pat. No. 2,813,459. One patent to Evans, U.S. Pat. No. 3,236,579 teaches a vacuum cup attachment for sunshading lenses while the Zingarelli U.S. Pat. No. 3,890,037, teaches spectacle frames with a removable tinted lens for converting ordinary spectacles to sunglasses by the attachment of a tinted flexible plastic lens which is frictionally engaged with a frame portion. The present invention overcomes many of the prior art problems by providing polarizing lens attachments for mounting to existing standard sunglasses having polarizing lenses which are rotable so that pairs of polarizing lenses are adjacent to each other, with one being rotatable to vary the density through the two lenses. Since the attachments are adapted to be placed upon a variety of sunglasses, a purchaser may select any type of sunglasses desired and then have the variable density feature added to the glasses as an option.

SUMMARY OF THE INVENTION

A variable density polarizing attachment for spectacles having polarizing lenses is provided along with a method of attaching a variable density polarizing attachment for spectacles having polarizing lenses therein. The attachment has a pair of polarizing lenses, along with a plurality of lens holding posts attachable to each lens of a pair of spectacles in pre-determined positions to rotably support each of the polarizing lenses adjacent one of the spectacle polarizing lenses. A method is provided in which a plurality of openings are cut or punched in the existing lens of the spectacles at pre-determined positions and thereafter inserting a post member through one side of the lens opening while attaching a locking member to the post member from the other side of the lens opening, thereby locking the post in place and then rotably attaching a polarizing lens to the posts.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
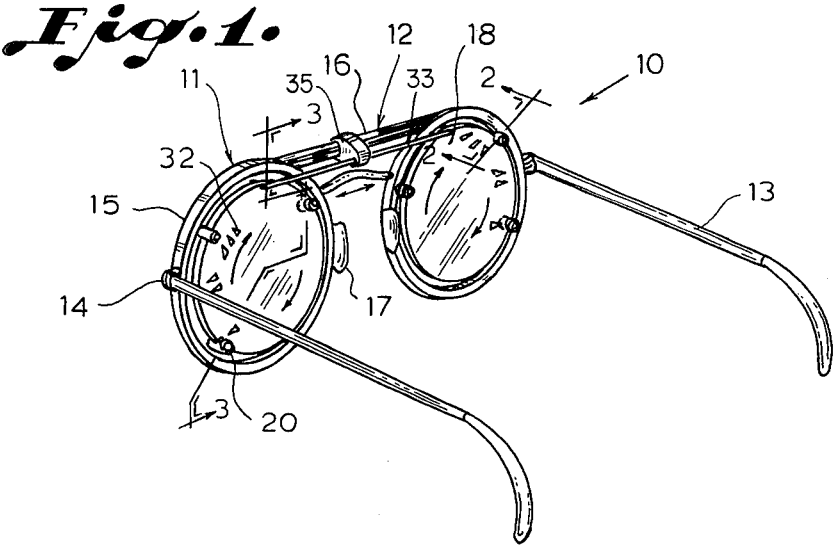
FIG. 1 is a perspective view of a pair of spectacles having the present invention attached.
Figure 2:
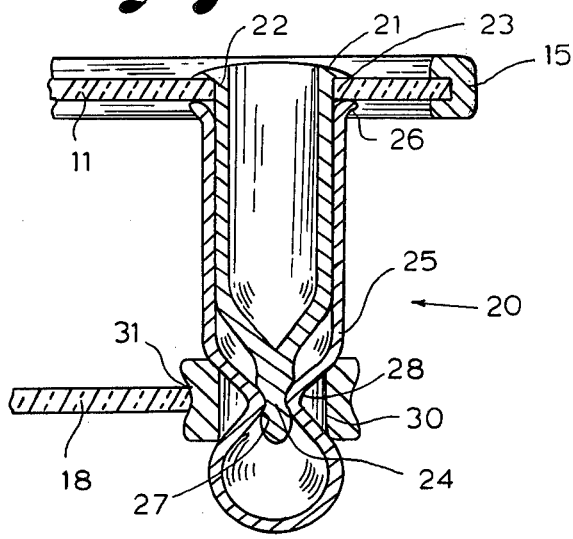
FIG. 2 is a sectional view taken on the Line 2—2 of FIG. 1.
Figure 3:
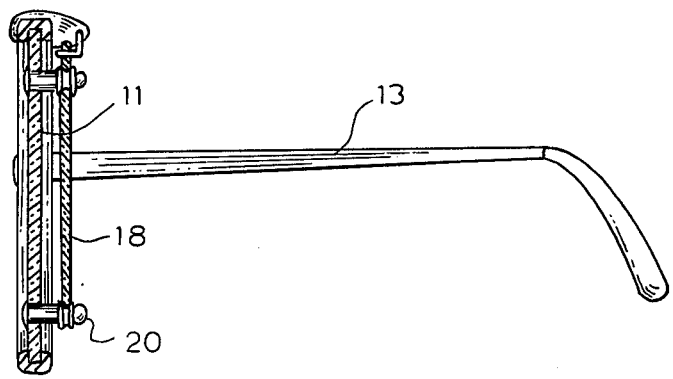
FIG. 3 is a sectional view taken on the Line 3—3 of FIG. 1.

Referring now to FIGS. 1 through 3 of the drawings, a pair of spectacles 10 are illutrated in FIG. 1 having a pair of lenses 11 in a frame 12. The frame has a pair of temples 13 hinged with hinges 14 to the frame front piece 15. The frame 12 may also have a bridge 16 and a nose pieces 17. Eyeglasses 10 have a pair of standard or special disc-shaped polarizing lenses 18 attached to the back portion of the front frame 15 adjacent the lenses 11 by a plurality of posts 20. The posts have been positioned around each lens 11 of the glasses 10 and attached thereto in a manner to support the lens 18 for rotation on the post 20. The post is more clearly illustrated in FIG. 2 as including a post insert 21 inserted through an opening 22 which has been drilled or punched through the lens 11. The post portion 21 has a flanged edge 23 which engages one side of the lens 11 and protrudes therethrough and has a nipple 24 on the end thereof. A locking member 25 is attached from the other side of the lens 11 and slides over the post portion 21 until a flanges portion 26 engages the opposite side of the lens 11. At the same time, a narrowed portion 27 on the interior of the locking member 25 engages a small annular groove 28 in the nipple 24 of the post portion 21 to thereby lock post portion 21 and locking post portion 25 to the lens 11. An annular lens supporting grommet 30 is attached to the exterior side of the narrow portion 27 of the locking member 25 and has an annular groove 31 therein for supporting the rotating polarizing lens 18. Thus, the polarizing lens 18 rotates in a set of three posts 20 on each lens 11 for each pair of spectacles.

A connecting bar 33 is attached to each of the polarizing lenses 18 so that the lens are moved together to maintain the same transmission. The connecting bar 33 may be attached to the lens 18 through an opening therein at a predetermined position with the bar 33 passing therethrough and bent to hold it to the lens. In addition, a sliding support member 35 will move the bar 33 and rotate each lens 19 to vary the transmission of light.

Polarizing adapters are attached to the lens 11 of the spectacles 10 by a method of fastening or drilling or punching an opening 22 in the lens, inserting the post portion 21 through the opening until the flanges 23 engage the lens 11, then sliding a locking member 25 over the post portion 21 from the opposite side of the lens 11 until it locks in place with the flanges 26 against the lens 11 and the groove 28 of the post member 21 engaging the locking portion 27 of the locking member 25. The rotating polarizing lens 18 may then be snapped into the grooves 31 and the grommets 30, which may be made of a slightly resilient material, such as rubber, firmly support the lens 18 in one position and allow rotation to different positions. The lens 18 may be formed or marked with a plurality of marks 32 as illustrated in FIG. 1 for identifying the positions of more or less transmission of light through the lenses 11 and 18.

Figure 4:
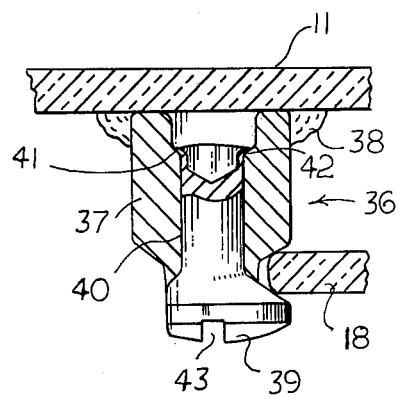
FIG. 4 is a sectional view of a second embodiment of a lens supporting post.

Referring to FIG. 4, a second embodiment of a lens post 36 is illustrated attached to a lens 11. A cylindrical post base portion 37 is attached with an adhesive 38 to the lens 11. A rotatable lens holding portion 39 has attached to the post base 37 by extending into an opening 40 and then being flared to form a curled portion 41 extending over an annular ledge 42. The post portion 39 is tightly fitted to the base 37 to prevent easy rotation of the portion 39. A slot 43 allows the rotation of post portion 39 with a screwdriver or the like. This post 36 allows the lens 18 to be attached or removed without bending the lens 19 or drilling an opening in the lens 11. One post 36 for each lens 11 used in conjunction with two posts 20 will allow the insertion and removal of the lens 18.

Figure 5:
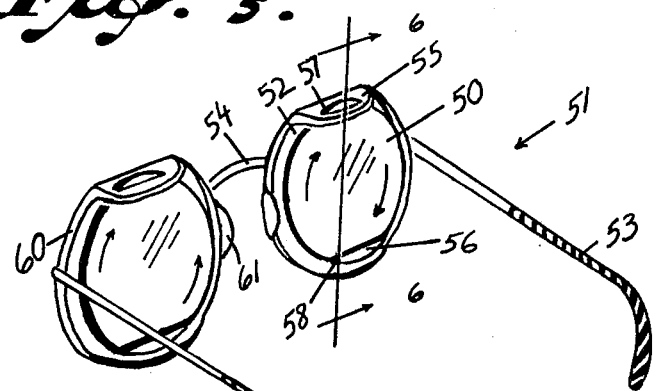
FIG. 5 is a perspective view of another embodiment of a pair of spectacles having attached polarizing lens.
Figure 6:
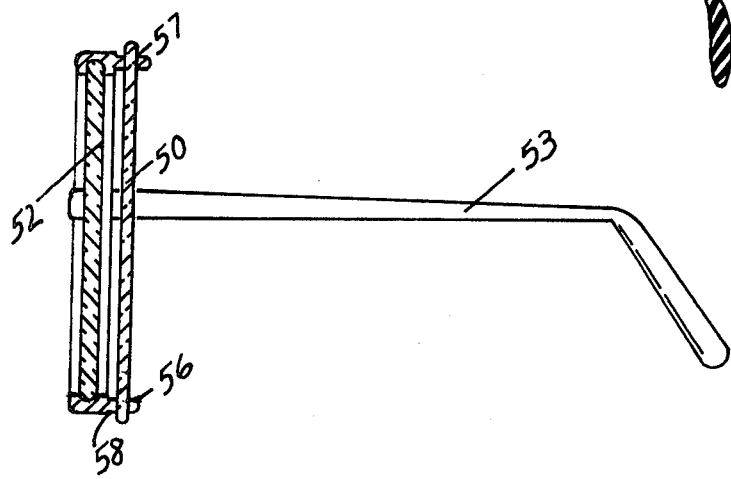
FIG. 6 is a sectional view taken along the Line 6—6 of FIG. 5.

Referring now to FIGS. 5 and 6, a third embodiment is illustrated for attaching a pair of polarizing lenses 50 to a pair of spectacles 51 having a pair of polarizing lenses 52 therein and having a pair of temple pieces 53 and a bridge 54. In this embodiment, the top and bottom portion of the lenses 52 have been bent to form tabs 55 and 56. The bending is accomplished with a slight heating along the folding edge. Upper tab 55 has a slot 57 therein, while each lower tab 56 has a slot 58 therein. This allows the lenses 50 to be snapped into position in the top and bottom slots where they can be easily rotated, but held adjacent the front lens 52. Thus, a pair of polarizing lenses 50 are held adjacent polarizing lens 52 and may e rotated to vary the density between the two lenses. The temples 53 connect to a frame portion 60 which had nose pieces 61 mounted therein. This embodiment, advantageously, can be adapted for clip-on and flip-flop type sunglasses which clip on to standard spectacles.

Figure 7:
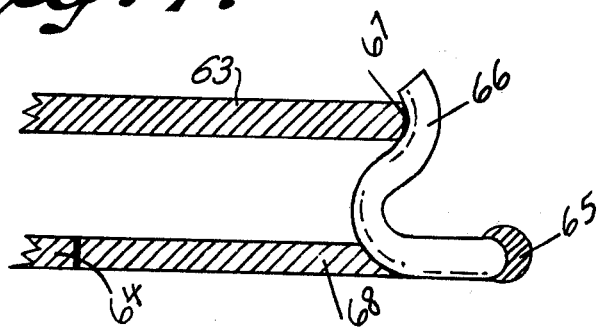
FIG. 7 is a sectional view of a modified lens attaching post.

FIG. 7 illustrates a modified embodiment for attaching a rotating polarizing lens 63 to spectacle lens 64 mounted in a spectacle frame 65. In this embodiment, three tabs 66 are cut out of plastic polarizing lens 64 and with the application of heat, bent and formed into an S-shape so that the polarizing lens 63 can be inserted into the arcuate portion 67 of each tab 66 which then supports the lens 63 for rotation therein. The lens 63 can be inserted by bending the edge slightly to snap the lens in place in the artcuate portions 67 of the tabs 66. This system requires the cutting of a rectangular tab portion leaving small rectangular openings with edges 68 in the lens. These small openings do not interfere with the normal vision through the lens.

It can be seen at this time that a pair of sunglasses of any desired shape and style can be altered, either in a factory or on-site locations to be converted to glasses having variable density for changing the light transmission through the lens. The glasses and lens can be made of polymer material or any material desired without departing from the spirit and scope of the invention and it should, accordingly, be clear that this invention is not to be construed as limited to the particular forms disclosed herein which are to be regarded as illustrative rather than restrictive.

I claim:

1. A variable density polarizing attachment for spectacles having polarizing lenses therein comprising in combination:
    a pair of polarizing lenses;
    a plurality of lens holding posts attachable to each lens of a pair of spectacles, said posts being grooved to rotatably retain said polarizing lens lenses; and
    means for attaching each said holding post to said eyeglasses in predetermined position to rotatably support each said polarizing lens in said post groove adjacent to each spectacle lens including each of said plurality of lens holding posts having first and second post members, said second post member being adatped to lock said first and second post members together to lock said post to said lens to such spectacles whereby light transmission through said spectacles can be varied by rotating said attached polarizing lens.

2. The apparatus in accordance with claim 1, in which said first post member is positioned through an opening in one lens of said spectacles and said second member is attached to said first member from the other side of said lens.

3. The apparatus in accordance with claim 2, in which said first post member slides through said opening in said spectacles until a flange thereon engages one side of said lens and said second member slides over said first member from the opposite side thereof until a flange on said second member engages the opposite side of said spectacle lens.

4. The apparatus in accordance with claim 3, in which said first post member has a groove therein for accepting an annular locking portion of said second member.

5. An apparatus in accordance with claim 4, in which said post has an annular grommet having an annular groove therein for rotatably supporting said polarizing lens.

6. The apparatus in accordance with claim 5, in which one of each of said pair of polarizing lenses has markings thereon to indicate the position of the polarizing lens relative to a spectacle lens that said polarizing lens is attached to.

7. The apparatus in accordance with claim 6, in which said first post member is attached by adhesive to said eyeglasses and said second post member is inserted in said first post member and rotatably supported therein.

8. A method of attaching a variable density polarizing attachment for spectacles having polarizing lenses therein comprising the steps of:
    making a plurality of openings in each lens of a pair of spectacles having polarizing lenses therein at a predetermined positions;
    inserting a post member through one side of each said lens opening; attaching a locking member to each said post member from the other side of said lens; and
    rotatably attaching a polarizing lens to said post adjacent each said lens of said spectacles whereby a variable density polarizing pair of spectacles is formed.

9. A method in accordance with claim 8, in which the steps of forming a plurality of openings includes drilling a plurality of openings at predetermined positions and inserting a post member therethrough from one side of said lens until a flange portion of said post member engages the front of said spectacle lens.

10. A method in accordance with claim 8, in which the step of attaching a locking member to said post member includes sliding said locking member over said post member until said locking member engages the opposite side of said spectacle lens.

* * * * *